F. H. DUKESMITH.
AIR BRAKE SYSTEM.
APPLICATION FILED OCT. 25, 1912.

1,064,624.

Patented June 10, 1913.
2 SHEETS—SHEET 2.

WITNESSES:
Wm Kauman
Edw H. Eddy.

INVENTOR
Frank H. Dukesmith
BY HIS ATTORNEY
J. Edward Thebaud

UNITED STATES PATENT OFFICE.

FRANK H. DUKESMITH, OF BUFFALO, NEW YORK, ASSIGNOR TO THE UNITED STATES AIR BRAKE CORPORATION, OF BUFFALO, NEW YORK, A CORPORATION OF NEW YORK.

AIR-BRAKE SYSTEM.

1,064,824.    Specification of Letters Patent.    Patented June 10, 1913.

Application filed October 25, 1912. Serial No. 727,747.

*To all whom it may concern:*

Be it known that I, FRANK H. DUKE-SMITH, a citizen of the United States, residing at Buffalo, in the county of Erie and State of New York, have invented certain new and useful Improvements in Air-Brake Systems; and I hereby declare the following to be a full, clear, and exact description of my invention, such as will enable others skilled in the art to which it appertains to make and use the same, reference being had to the accompanying drawings, and to figures of reference marked thereon, which form part of this specification.

Like figures of reference refer to like parts.

My invention relates to air brake systems, particularly in connection with brakes on locomotives and other self-propelled vehicles. I have planned to improve the present method of controlling said brakes and to do so my object has been to provide an independent system containing an independent brake valve and other valves coöperating therewith and piping connections that will afford alternate control of the brakes on the locomotive and provide means for making independent applications of said brake without interfering with the automatic operation of the said brakes and particularly to provide means for quickly releasing the said brakes after they have been applied automatically or independently. To attain these objects I provide an independent brake valve, a retaining valve manually controlled by pressure, a brake cylinder exhaust valve manually controlled by pressure, an auxiliary stop valve manually controlled by pressure and piping connections necessary to correlate these valve mechanisms.

Figure 1:
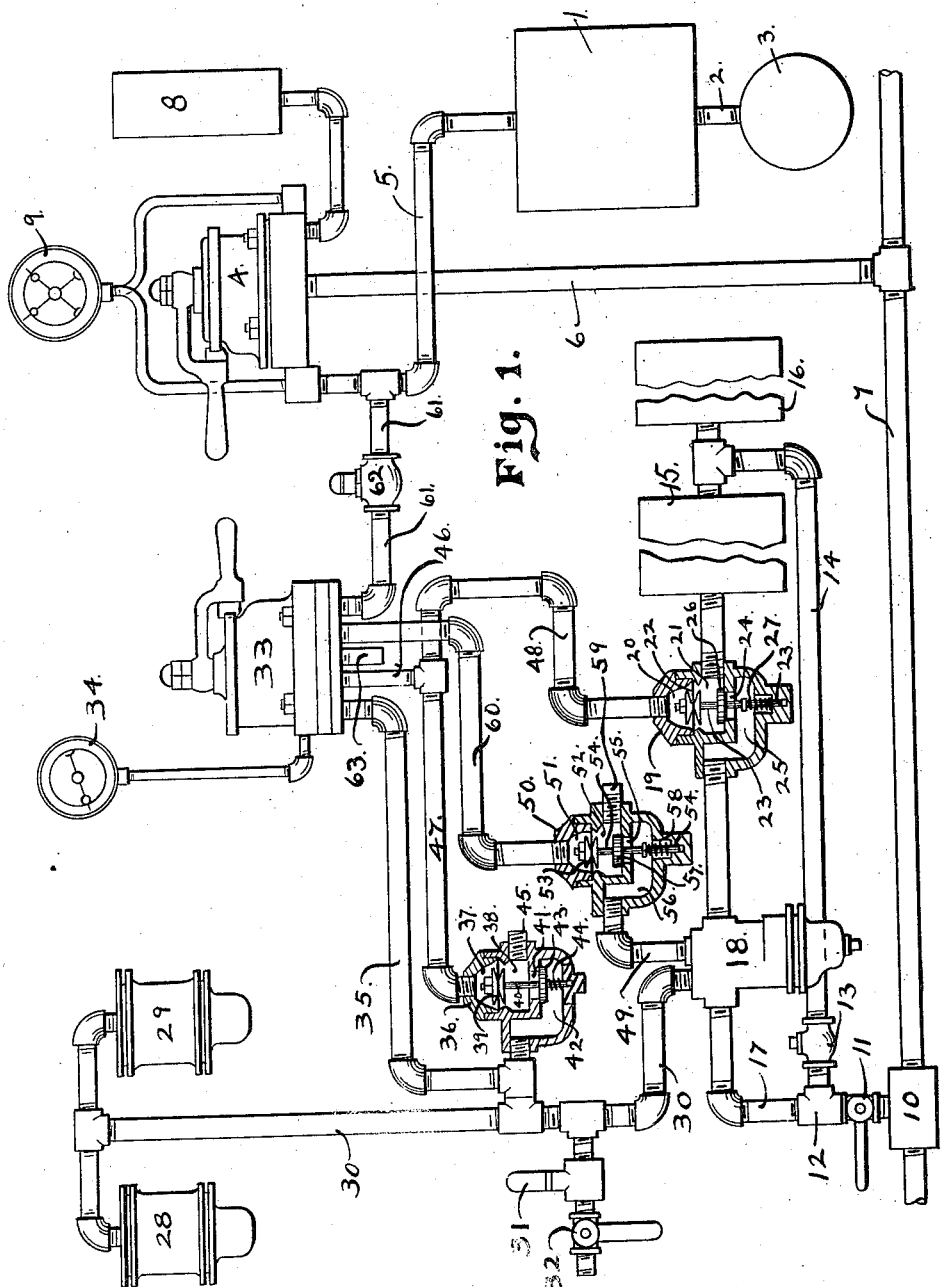
Figure 2:
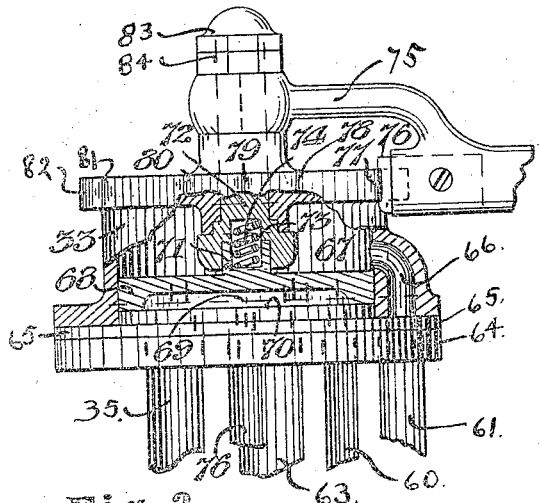
Figure 3:
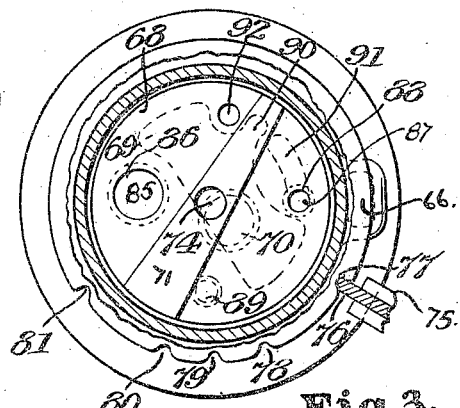
Figure 7:
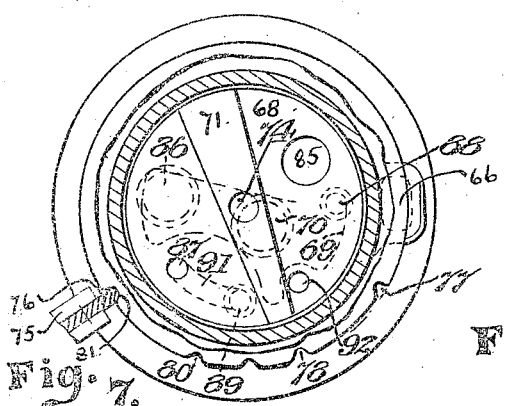
Figure 4:
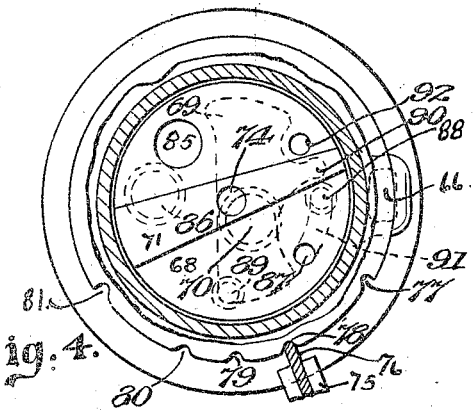
Figure 6:
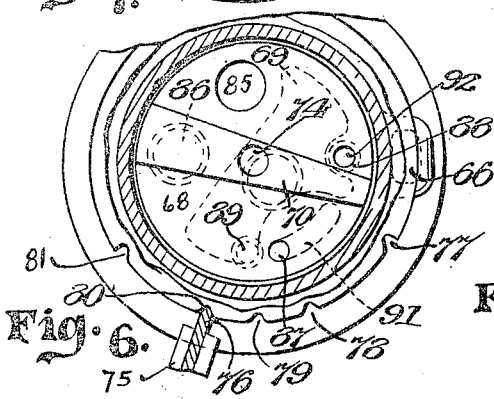
Figure 5:
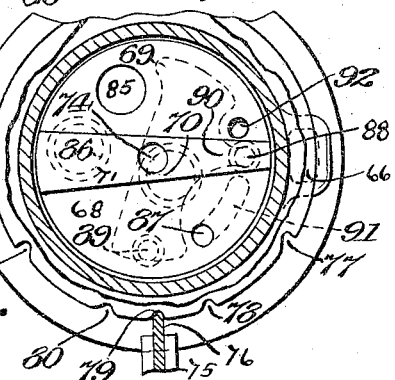

A diagrammatic illustration of parts of my system in conjunction with parts of the usual automatic air brake equipment is shown in Figure 1. Fig. 2, is an elevation of my independent brake valve and is shown partially broken away to illustrate its inner parts. Fig. 3, is a top plan of said independent brake valve with the top broken off to show the relative position of ports and channels in the valve disk and valve seat, when the handle of this valve is placed in the first position for straight air application of the brakes. Fig. 4, is similar to Fig. 3 except that the handle is in second relative position of disk and valve seat. Fig. 5, similar to Fig. 3 differs in that it shows the third position of disk on valve seat. Fig. 6, illustrates in broken top plan the fourth position of disk on valve seat in said independent valve. Fig. 7, illustrates said disk and valve seat in the fifth or full release position of said disk and said valve seat.

In the figures, 1 in Fig. 1 is the main reservoir connected by pipe 2 to the pump 3. An engineer's automatic brake valve is shown at 4 connected by piping 5 with the main reservoir 1. Leading from the valve 4 is the pipe 6 connecting with the train pipe 7. An equalizing reservoir 8 and a duplex gage 9 are shown connected with the valve 4. On the train pipe 7 is a strainer 10 to which is attached the cut-out cock 11, and in succession the T 12, the check valve 13, the piping 14, the two auxiliary reservoirs 15 and 16. Connected with the T 12 is the piping 17 to which is connected the triple valve 18. Between the triple valve 18 and the auxiliary reservoir 15 is the stop-valve 19 in tubular connection with 18 and 15 and adapted to be normally open. This valve, shown in section has three chambers, one of which is an independent pressure chamber, marked 20. This chamber is separated from the one below marked 21 by the diaphragm 22. This diaphragm is fixed on a stem 23 passing down through the port 24 into chamber 25. A valve disk 26 on the stem 23, is adapted to close the port 24 when the diaphragm 22 is forced down, but a spring 27 is adapted to raise the disk 26 when there is no extra pressure in the chamber 20, thus keeping this stop-valve 19 normally open. Brake cylinders 28 and 29 are connected with the triple valve 18 by the piping 30. At the left of this piping 30, in branch connection, is the safety valve 31 and the cut-out cock 32 adapted for tender brake cylinder connections, not shown.

33 is my independent brake valve, to which is attached a cylinder pressure gage 34. Connecting this valve 33 with the cylinder pipe 30 is the piping 35. To the right of the juncture of 30 and 35 in tubular connection is shown in section the exhaust valve 36. This valve 36 has an independent pressure chamber 37, which is separated from the chamber 38 by the diaphragm 39. 39 is fixed on a spindle 40, which passes down through the port 41 and is in loose contact with a disk 43. Within the chamber 42 is the spring 44, upon the stem of the disk 43 adapted to hold the port 41 normally closed. By the nipple 45 the chamber 38 is open to the atmosphere. A pipe 46 leading down from a port in the valve 33 has a branch 47 connecting it with the chamber 37 of the valve 36. Another branch marked 48 connects with the chamber 20 of the valve 19. Leading from an exhaust channel in the triple valve 18 is the piping 49 to which is tubularly connected the retaining valve 50, which is shown in section. In the top of 50 is an independent pressure chamber 51, separated from the chamber 52 by the diaphragm 53 which is fixed on a stem 54 passing down through a port 55 into a chamber 56. A disk 57 on the stem 54 within the chamber 52 is adapted to close the port 55 by pressure on the diaphragm 53, but when not so operated, the disk 57 is held normally open by means of the spring 58 lifting the stem 54 and the disk 57, and in this position holding the valve 50 normally open to the atmosphere through the open nipple 59. Piping 60 connects the chamber 51 with a port within the valve 33. Connecting the valve 33 with the main reservoir piping 5 is the piping 61, in the line of which is the reducing valve 62. Leading from an atmospheric port within the valve 33 is the open nipple 63.

In Fig. 2, in the sectional elevation of my independent brake valve 33, is shown a pipe bracket 64 below which depends the pipes of the respective piping lines 61, 60, and 35, together with the pipe 46 and the nipple 63. Each of these tubular connections except that marked 61 leads from a separate port in the valve seat 65, which ports are shown in plan in the remaining figures. A channel 66 within the casing of the valve 33 opens into a chamber 67, in the bottom of which is the valve-disk 68. 68 has an exhaust cavity 69 open on the valve seat 65, to the atmosphere, through a port 70 of the said valve-seat 65, which is connected with the open nipple 63. Integral with the top of the valve disk 68 is the cross-lug 71 engaging the key 72. A spring 73 positioned within a cavity 74 in the center of the cross-lug 71, is adapted to hold the disk 68 close upon the seat 65, when no pressure is in the chamber 67. A handle 75, the outer end of which is shown broken off, engages the key 72 in a manner to turn the same. A spring dog 76, adapted for reciprocation within the handle 75, projects, spring pressed, normally toward the key 72 to engage notches 77, 78, 79, 80 and 81 in the flange 82, to definitely locate each of the five angular positions of the valve-disk on the valve-seat. Two nuts 83 and 84 secure the handle 75 to the key 72.

In Fig. 3 the spring dog 76 is shown in notch 77. With the handle 75, the key 72 and the top of the casing of the valve 33 removed, the disk 68 is shown on the seat 65 in a position due to the engagement of the spring dog 76 in the notch 77. Two holes in this disk are shown to register or be concentric with two ports in the valve-seat 65. The larger hole 85 coincides with a port 86, and the small hole 87 coincides with the port 88. The port 89 in said valve-seat 65 is covered with the disk 68, but the port 70 in 65 is in open engagement with the cavity 69 on the underside of the disk 68. The cavity 69 has an extension 90, which fulfils no office in the first or "application position" of the valve 33. Extending from the hole 87 on the under side of the disk 68 is the circumferential cavity 91, which in this position of the disk performs no function. The spring cavity 74 is shown in the cross-lug 71. The ports in the valve seat are in the following relation to the piping connected with the pipe bracket 64:—The hole 85 and the port 86 form an open channel from the chamber 67 into the piping 35; while the hole 87 and the port 88 form an open channel from the chamber 67 into the piping 60. The piping 61 and the chamber 67 are in open communication through the channel 66 at all times. The port 89 is in communication with the pipe 46, but in the "application position" the port 89 is closed. Another hole, marked 92, is shown through the disk 68, but in this position is blanked against the valve-seat 65.

In Fig. 4, the disk 68 is in the second or "retaining position" upon the valve-seat 65. In this position the port 86 is closed by the disk 68 and the hole 85 is blanked against the seat 65. By means of the circumferential cavity 91 and the hole 87 the chamber 67 is still in communication with the port 88. A corner of the exhaust cavity 69, registering with the port 89, opens communication between the pipe 46 and the atmosphere through the exhaust port 70. In this second position of the disk 68, the spring dog 76 is in the notch 78. The hole 92 is blanked against the seat 65.

In Fig. 5, the disk 68 is in the third or "running position" upon the valve seat 65. In this position the port 86 is still closed by the disk 68, and the holes 85 and 92 are still blanked against the seat 65. The port 89 is still in open communication with the exhaust cavity 69, but the hole 87 and its circumferential cavity 91 are blanked against the face of the valve seat 65. The port 88 being in this third position, in communication with the extension 90 of the exhaust cavity 69, opens the piping to the atmosphere.

In Fig. 6, the disk 68 is in the fourth or "lap" position upon the valve-seat 65. In this position the port 86 is still closed by the disk 68, and hole 85 and the hole 79 with its circumferential cavity 91 are blanked against the valve-seat 65. The hole 92 is in register with the port 88 and forms an open communication between the chamber 67 and the pipe 60. The port 89 is still in open communication with the exhaust cavity 69.

In Fig. 7, the disk 68 is in the fifth or "quick release position" upon the valve-seat 65. In this position the ports 86 and 88 are in open communication with the exhaust cavity 69. The chamber 67 is in open communication with the pipe 46 by means of the port 89 connecting with the circumferential cavity 91 and the hole 87. The holes 85 and 92 are blanked against the seat 65 and perform no function in this position of the valve 33.

In operating my system in connection with any of the standard automatic air brake systems, I perform various functions according to whether or not the automatic brake is applied or released. For example, should the engineer's brake valve of the automatic system be in, what is known as, running position, and the triple valve also in running position, then should it be desired to independently apply the locomotive brakes the handle of my independent brake valve 33, is placed in its first or "application position," which causes reduced main reservoir pressure to pass through the chamber 67, and through hole 87, port 88 into piping 60 into the chamber 51 of the retaining valve 50 thereby closing the exhaust channel of the triple valve 18; at the same time air is passing through chamber 67 of my independent brake valve 33, down through hole 85 and port 86 into piping connections 35 and chamber 42 of the exhaust valve 36, the port 41 of which is normally closed, and into pipe 30 to the brake cylinders 28 and 29, thus setting the brakes, to whatever degree of pressure has been allowed to pass through the brake valve 33, while the handle 75 is in this first position as shown in Fig. 3.

By bringing the handle of my brake valve to its second position, as shown in Fig. 4, the flow of air is shut off from my brake valve 33 to the cylinders 28 and 29, but the flow of air from the brake valve 33 to the retaining valve 50 is uninterrupted by reason of the fact that in this position of my independent brake valve 33, the piping 60 remains in free communication with chamber 67, through hole 87 and the circumferential cavity 91 and port 88, as shown in Fig. 4; thus preventing brake cylinder pressure from exhausting by way of exhaust channel of the triple valve 18, the engineer's automatic brake valve 4 and the triple valve 18 still being in release position. Now by placing the handle of my valve 33 in the third or "running position" as shown in Fig. 5, pressure communication between the chamber 67 of valve 33 and the chamber 51 of the retaining valve 50 has not only been cut off by the advance of the circumferential cavity 91, but on account of the extension 90 of the exhaust cavity 69 becoming registered with the port 88 the pressure in the chamber 51 of the retaining valve is free to exhaust to the atmosphere causing the valve 50 to become normally open and permits the brake cylinder pressure to exhaust to the atmosphere by way of the exhaust channel of the triple valve 18 and the exhaust port of the retaining valve 50. But should it be desired to quickly release the brakes the handle of valve 33 is put in its last or "quick release position" as shown in Fig. 7. In this position the ports 86 and 88 are in register with the exhaust cavity 69, which not only permits brake cylinder pressure to exhaust direct to the atmosphere, through the exhaust port 70, but it also exhausts the pressure from the chamber 51 of the retaining valve 50 by way of port 88. At the same time air from the chamber 67 flows through hole 87, circumferential cavity 91 and port 89 into pipe 46 to chamber 37 of the cylinder exhaust valve 36 forcing down the diaphragm 39 and causing its stem 40 to unseat disk valve 43, thereby opening port 41 and permitting brake cylinder pressure from chamber 42 to exhaust to the atmosphere by way of exhaust nipple 45, thus providing three outlets for the brake cylinder while the triple valve is in release position namely by way of the exhaust port 70 of valve 33; the exhaust nipple 45 of valve 36 and exhaust nipple 59 of valve 50. But should it be desired to make a partial quick release of brake cylinder pressure, the handle of my brake valve 33 after having been placed in fifth or "quick release position" is placed in lap position as shown in Fig. 6 which separates port 86 from exhaust cavity 69, and stops the flow of brake cylinder pressure to the atmosphere and exhausts the pressure from chamber 37 of the exhaust valve 36 by way of port 89 and exhaust cavity 69. In this fourth position of my independent brake valve 33 the retaining valve 50 is held closed by air passing from chamber 67 of valve 33 through hole 92 and port 88 which connects with piping 60 leading to chamber 51 of valve 50. This feature of my brake valve 33 permits the brake cylinder pressure to be gradually released regardless of the position of the triple valve.

Should it be desired to independently release the locomotive brakes after they have been applied automatically either by means of the engineer's brake valve or by the bursting or parting of the train pipe 7, then by placing the handle 75 of valve 33 in the fifth or "quick release position" it not only places port 86 in communication with the exhaust port 70, but it causes the exhaust valve 36 to be forced open by air passing down through hole 87 in cavity 91 and port 89 into pipe 60 and chamber 37 of valve 36 opening said valve, but at the same time causes pressure from chamber 67 of valve 33 to flow into branch piping 48 into the chamber 20 of the stop-valve 19, thereby closing the port 24 and preventing the auxiliary pressure from flowing through the triple valve 18 into the brake cylinder 28 and 29. This action of valve 19 in stopping off the auxiliary reservoir pressure while the triple valve 18 is in service or emergency position, allows the brake cylinders to be quickly emptied and avoids the skidding or flattening of the wheels of the locomotive, for if the auxiliary reservoir pressure were not stopped off after the bursting of the train pipe 7, the brake cylinder pressure could not be released quick enough to prevent damage to the locomotive wheels, as the triple valve 18 being in service or emergency position would allow the auxiliary pressure to continue to flow into the brake cylinders and keep the brakes applied until both the auxiliary reservoir and brake cylinder pressure were sufficiently reduced to relieve the pressure against the brake shoes.

When the handle of my brake valve 33 is carried in "running position" as shown in Fig. 5, the automatic brake can then be used just the same as though my valves were not on the locomotive, as this position of my brake valve does not permit of any pressure to pass through it one way or the other and the retaining and stop valves are normally open while the cylinder exhaust valve remains normally closed.

I claim:—

1. An independent air brake system comprising a main reservoir, means for supplying said reservoir with compressed air, an independent brake valve adapted by manual control of its parts to effect passages for the flow of compressed air to parts of said system and to the atmosphere and to retain said compressed air within said system parts, piping connections between said independent brake valve and said main reservoir, having within said connections a pressure reducing valve, a brake cylinder, tubular connections between said brake valve and said brake cylinder, an exhaust valve in communication with said tubular connections, adapted to be controlled manually by pressure, and a conduit connecting said independent brake valve with said exhaust valve.

2. In an air brake system an engineer's automatic brake valve, a train pipe, a triple valve connected by piping to said train pipe, a stop-valve adapted to be normally open and to be closed independently by means of compressed air passing to it through an independent air connection, an auxiliary reservoir, piping between said auxiliary reservoir and said triple valve having thereon the said stop-valve, normally open to allow of the free passage of air between said triple valve and said auxiliary reservoir, a brake cylinder, piping connections between said brake cylinder and said triple valve, an independent brake valve adapted by manual control of its parts to effect passages for the flow of compressed air to parts of said system or to the atmosphere, or to retain said compressed air within parts of said system, piping connections between said independent brake valve and said main reservoir, tubular connections between said independent brake valve and said brake cylinder, an exhaust valve adapted to be manually controlled by pressure and to be normally closed, said exhaust valve being in communication with said tubular connections; independent tubular connections between said independent brake valve and said exhaust valve, a retaining valve in communication with the exhaust channel of said triple valve adapted to be manually controlled by pressure, and adapted to be normally open to the atmosphere, independent connections between said retaining valve and said independent brake valve, and an independent conduit between said stop-valve and said independent tubular connections, said stop-valve being thereby connected to said independent brake valve.

3. In an air brake system, a main reservoir, means for supplying compressed air to said main reservoir, a brake cylinder, a conduit adapted to pass compressed air to said brake cylinder, and to allow said air to exhaust from said brake cylinder, means adapted to automatically operate said brake cylinder, and means adapted to independently operate said brake cylinder, said means affording three simultaneously operating exhaust outlets for quickly releasing pressure from said brake cylinder.

4. In an air brake system, a main reservoir, means for supplying said main reservoir with compressed air, an auxiliary reservoir, a triple valve, a brake cylinder, a conduit adapted to pass compressed air to said brake cylinder and to allow said air to exhaust from said brake cylinder, a stop-valve between the auxiliary reservoir and the triple valve adapted to be normally open and to be closed by pressure independently applied, an engineer's automatic brake valve, means, apart from said brake valve, adapted to independently operate said brake cylinder, means adapted to release said brake cylinder through said conduit direct to the atmosphere and correlated means adapted to simultaneously close the said stop-valve to confine air in said auxiliary reservoir pending the independent release of said brake cylinder.

5. In an air brake system a source of fluid pressure, a brake cylinder, an exhaust valve adapted to be manually controlled by pressure connected with said brake cylinder, a triple valve, a retaining valve connected with said triple valve and adapted to be manually controlled by pressure, an auxiliary reservoir, a stop-valve connected with said triple valve and said reservoir and adapted to be manually controlled by pressure, an independent brake valve comprising a casing having an inner chamber connected with a source of fluid pressure, a valve seat having therein four ports, one of which is connected with the atmosphere, one of which is connected to said brake cylinder, one of which is connected with said exhaust valve and one of which is connected with said stop valve, a disk engaging said valve seat, and forming a floor to said chamber, said disk having passing there through three holes, one of which holes being connected with a circumferential cavity, open to the face of said valve seat, said disk having also an exhaust cavity open to the face of said valve seat and said port connected to the atmosphere, said ports, holes and cavities being so correlated as to form passages within said valve to perform functions in five definite angular positions of said disk on said valve seat substantially as set forth.

6. In an air brake system, a main reservoir, means for supplying said main reservoir with compressed air, an auxiliary reservoir, a triple valve, a brake cylinder, a conduit adapted to pass air to said brake cylinder and to allow said air to exhaust from said brake cylinder, a stop-valve between the auxiliary reservoir and the triple valve adapted to be normally open and to be closed by pressure independently applied, an engineer's automatic brake valve, a device connected with said stop-valve and with said conduit, adapted to be manually controlled to cause said stop-valve to close and confine air in said auxiliary reservoir and to cause air to exhaust from said cylinder through said conduit and said device, when parts of said triple valve are in a service position.

FRANK H. DUKESMITH.

Witnesses:
   EDW. H. EDDY,
   WILLIAM BRENNAN, Jr.